(12) United States Patent
Fujita

(10) Patent No.: US 11,598,085 B2
(45) Date of Patent: Mar. 7, 2023

(54) ANCHOR BOLT FOR ADHESIVE ANCHOR, ADHESIVE ANCHOR, AND METHOD FOR CONSTRUCTING ADHESIVE ANCHOR

(71) Applicant: FS TECHNICAL CORPORATION, Tokyo (JP)

(72) Inventor: Shogo Fujita, Tokyo (JP)

(73) Assignee: FS TECHNICAL CORPORATION, Tokyo (JP)

( * ) Notice: Subject to any disclaimer, the term of this patent is extended or adjusted under 35 U.S.C. 154(b) by 128 days.

(21) Appl. No.: 16/761,277

(22) PCT Filed: Oct. 29, 2018

(86) PCT No.: PCT/JP2018/040086
§ 371 (c)(1),
(2) Date: May 4, 2020

(87) PCT Pub. No.: WO2019/093177
PCT Pub. Date: May 16, 2019

(65) Prior Publication Data
US 2020/0284028 A1    Sep. 10, 2020

(30) Foreign Application Priority Data
Nov. 9, 2017   (JP) .............................. JP2017-216546

(51) Int. Cl.
*E04B 1/41*        (2006.01)
*F16B 5/08*        (2006.01)
(Continued)

(52) U.S. Cl.
CPC .............. *E04B 1/4157* (2013.01); *F16B 5/08* (2013.01); *E04B 1/2604* (2013.01); *F16B 33/004* (2013.01)

(58) Field of Classification Search
CPC ........ E04B 1/4157; E04B 1/41; E04B 1/2604; F16B 5/08; F16B 33/004; E21D 21/0033
(Continued)

(56) References Cited

U.S. PATENT DOCUMENTS 4,224,971 A * 9/1980 Muller .................. F16B 13/143
156/305
5,344,268 A * 9/1994 Fischer ................. F16B 13/141
411/930
(Continued)

FOREIGN PATENT DOCUMENTS

| CA | 985936 A | 3/1976 |
|---|---|---|
| JP | S48-001082 Y1 | 1/1973 |

(Continued)

OTHER PUBLICATIONS

May 12, 2020 International Preliminary Report on Patentability issued in International Patent Application No. PCT/JP2018/040086.
(Continued)

*Primary Examiner* — Beth A Stephan
(74) *Attorney, Agent, or Firm* — Oliff PLC

(57) ABSTRACT

An anchor bolt for an adhesive anchor or the like that can be caused to exert substantial tensile strength at a relatively shallow embedding depth. An anchor bolt for an adhesive anchor that is fixed via adhesive to an anchor hole formed in a fixed body includes: a head part that is inserted into a hole back part of the anchor hole; a shank part that is continuous with the head part and formed to have a diameter smaller than the diameter of the head part; and a sleeve part into which the shank part is inserted, the sleeve part extending from an opening part to the hole back part of the anchor hole and having a tip end thereof abutted onto the head part.

7 Claims, 6 Drawing Sheets

(51) Int. Cl.
*E04B 1/26* (2006.01)
*F16B 33/00* (2006.01)

(58) Field of Classification Search
USPC .......................................................... 411/82
See application file for complete search history.

(56) References Cited

U.S. PATENT DOCUMENTS

| | | | | |
|---|---|---|---|---|
| 5,562,377 A * | 10/1996 | Giannuzzi | ............. | F16B 13/141 |
| | | | | 411/258 |
| 5,569,007 A * | 10/1996 | Abraham | ............. | F16B 11/006 |
| | | | | 411/930 |
| 5,641,256 A * | 6/1997 | Gundy | ................. | F16B 13/124 |
| | | | | 411/902 |
| 5,690,455 A * | 11/1997 | Fischer | ................ | F16B 13/065 |
| | | | | 411/60.1 |
| 6,393,795 B1 * | 5/2002 | Irwin | .................... | F16B 13/141 |
| | | | | 52/707 |
| 6,457,910 B1 * | 10/2002 | Ludwig | ............... | E21D 21/0033 |
| | | | | 405/269 |
| 7,802,951 B2 * | 9/2010 | Houck | .................... | F16B 33/02 |
| | | | | 411/416 |
| 9,551,370 B2 * | 1/2017 | Glogger | ................ | F16B 13/141 |
| 2005/0058521 A1 * | 3/2005 | Stevenson | ............. | F16B 13/143 |
| | | | | 411/82 |

FOREIGN PATENT DOCUMENTS

| | | |
|---|---|---|
| JP | S57-066251 A | 4/1982 |
| JP | H05-66103 U | 8/1993 |
| JP | 2005-060939 A | 3/2005 |
| JP | 2011-196130 A | 10/2011 |

OTHER PUBLICATIONS

Jan. 15, 2019 Search Report issued in International Patent Application No. PCT/JP2018/040086.

* cited by examiner

ANCHOR BOLT FOR ADHESIVE ANCHOR, ADHESIVE ANCHOR, AND METHOD FOR CONSTRUCTING ADHESIVE ANCHOR

TECHNICAL FIELD

The present invention relates to an adhesive anchor in a post-installed anchor and, in particular, to an anchor bolt for an adhesive anchor, an adhesive anchor, and a method for constructing an adhesive anchor.

BACKGROUND ART

Conventionally, a known adhesive anchor is of a type including a chemical anchor rod having an indicator to indicate an embedding depth in its rod body and adhesive filled in the gap between the rod body and the inner wall of an embedding hole (see Patent Document 1).

The chemical anchor rod includes the rod body of a full thread inserted into the embedding hole bored in a base material, and the head part of an exposed portion of the rod body is provided with a fastening end having a polygonal shape in a plan view, the maximum length of the fastening end being the same as the length of the diameter of the rod body at most. Further, the indicator to indicate an embedding depth is cut into the barrel part of the rod body over the outer periphery of the rod body. By adapting a hammer drill or the like to the fastening end, it becomes possible to easily embed the rod body in the embedding hole and embed the rod body in the embedding hole at a proper embedding depth with the indicator as a guideline.

[Patent Document 1] JP-U-5-66103

DISCLOSURE OF THE INVENTION

Problems that the Invention is to Solve

As a post-installed anchor, a conventional adhesive anchor (chemical anchor rod) as described above has an embedding depth 10 times or more (15 times is recommended) of an anchor diameter, while a metal expansion anchor (mechanical anchor) has an embedding depth (effective embedding length) four to five times (seven times in the case of ensuring reliability) of an anchor body diameter (for example, P53 to P67 of the document □Post-Installed Anchor□ published on Jun. 10, 1990, Authors: Tsuneo Okada, etc., Publisher: Gijutsu-Shoin Corporation).

It is described in the document that cone failure is caused in concrete in a state in which substantial tensile strength is not obtained when an adhesive anchor has an embedding depth (effective embedding length) about five times of an anchor diameter, that mushroom-shaped superposed failure is caused in concrete at a shallow position and bond failure is caused between adhesive and concrete at a deep position in a state in which substantial tensile strength is not obtained when the adhesive anchor has an embedding depth about seven to eight times of the anchor diameter, and that the adhesive anchor preferably has an embedding depth 10 times or more of the anchor diameter to obtain substantial tensile strength (however, mushroom-shaped superposed failure is also caused in this case). Note that the effective embedding length (le)=the boring depth (1) of concrete□the diameter (de) of an anchor bolt is established. The phenomena peculiar to the adhesive anchor (particularly, the mushroom-shaped superposed failure) have also been confirmed in pulling examination by the Applicant.

As described above, there has been a problem that the conventional adhesive anchor has a deeper embedding depth and poorer construction performance in comparison with the metal expansion anchor (mechanical anchor).

The present invention has an object of providing an anchor bolt for an adhesive anchor, an adhesive anchor, and a method for constructing an adhesive anchor that can be caused to exert substantial tensile strength at a relatively shallow embedding depth.

Means for Solving the Problems

An anchor bolt for an adhesive anchor of the present invention is an anchor bolt for an adhesive anchor that is fixed via adhesive to an anchor hole formed in a fixed body, the anchor bolt including: a head part that is inserted into a hole back part of the anchor hole; a shank part that is continuous with the head part and formed to have a diameter smaller than a diameter of the head part; and a sleeve part into which the shank part is inserted, the sleeve part extending from an opening part to the hole back part of the anchor hole and having a tip end thereof abutted onto the head part, wherein an outer peripheral surface of the sleeve part is secured by the adhesive to contribute to tensile strength.

According to the configuration, a tensile force (pulling force) acts on the sleeve part as a compressive force via the head part when the tensile force acts on the shank part in a state in which the anchor bolt is fixed to the anchor hole via the adhesive. Since the sleeve part is secured by the adhesive filled between the sleeve part and the anchor hole in this case, the anchor bolt exerts a wedge effect on the fixed body at the head part. Further, since the tensile force (compressive force) acts on the sleeve part from the tip end side via the head part, the tensile force does not intensively act on the base end side (on the side of the opening part) of the sleeve part and failure (mushroom-shaped superposed failure) is not caused at a shallow portion of the fixed body. Accordingly, substantial tensile strength can be exerted at a shallower embedding depth over conventional art. Further, since the shank part does not directly contact the adhesive, the toughness of the anchor bolt (shank part) useful for supporting a structure is not impaired.

Note that the head part and the shank part may be integrated with each other or may be separated from each other (by screw connection or the like). Further, the fixed body includes, besides concrete, stone or the like for which an adhesive anchor is generally used. Needless to say, the tip end of the head part is preferably formed into a shape cut at 45° or the like when adhesive of a capsule type is used.

In this case, the tip end of the sleeve part is preferably anchored to the head part.

According to the configuration, the sleeve part and the head part are integrated with each other. Therefore, the sleeve part is not deviated or displaced from the head part in construction or the like, whereby operability or construction performance can be improved.

Note that the sleeve part is preferably anchored to the head part by welding or adhesion.

In these cases, the outer peripheral surface of the sleeve part that contacts the adhesive is preferably formed into an irregularity shape.

According to the configuration, the shearing resistance (pulling resistance) of the adhesive filled between the sleeve part and the anchor hole can be substantially exerted.

Further, the anchor hole preferably has a straight hole part that extends from the opening part to the hole back part, and the head part preferably has a circulation part that causes the adhesive to relatively circulate from a tip end side to a base end side thereof during the insertion.

According to the configuration, the adhesive relatively flows inside the circulation part when the anchor bolt is inserted into the anchor hole, whereby the viscous resistance of the adhesive can be reduced. Thus, the insertion of the anchor bolt into the anchor hole can be smoothly performed. Further, in the case of adhesive of a capsule type, the stirring of the adhesive can be accelerated by the circulation unit.

Note that the circulation unit is preferably a groove formed on the outer peripheral surface of the head part or a hole penetrating the head part. That is, the circulation part is preferably an inclined groove or an inclined hole inclined with respect to an axial line, besides being a vertical groove or a vertical hole parallel to the axial line. Further, the circulation part may be singly provided, but a plurality of the circulation parts are more preferably provided in a circumferential direction.

Similarly, the anchor hole preferably has a diameter expanded part at the hole back part into which the head part is inserted, the diameter expanded part preferably has a tapered hole part that expands toward a hole bottom side, and the head part preferably has a tapered surface part that faces the tapered hole part.

According to the configuration, the tensile force (pulling force) that is applied to the head part can be caused to act not only on the adhesive but also on the fixed body via the tapered hole part by the tapered surface part in a dispersed manner. As a result, tensile strength can be improved as a whole.

An adhesive anchor according to the present invention includes: the anchor bolt for an adhesive anchor described above; and the adhesive filled in a gap between the anchor hole and the anchor bolt.

According to the configuration, substantial tensile strength can be exerted at a shallower embedding depth over conventional art in the anchor bolt secured to the anchor hole via the adhesive.

A method for constructing an adhesive anchor of the present invention is a method for constructing the adhesive anchor described above, the method including: a boring and cleaning step of boring the anchor hole in the fixed body and cleaning an inside of the anchor hole; an injection step of injecting the adhesive into the anchor hole; an insertion step of inserting the anchor bolt into the anchor hole; and a setting step of maintaining a position of the anchor bolt inside the anchor hole until the adhesive is cured.

According to the configuration, the anchor bolt exerts a wedge effect with respect to a tensile force when the adhesive is cured after the setting step. Accordingly, the adhesive anchor that exerts substantial tensile strength at a shallower embedding depth over conventional art can be configured.

DESCRIPTION OF EXEMPLARY EMBODIMENTS

Hereinafter, an adhesive anchor according to an embodiment of the present invention will be described with reference to the accompanying drawings. In the adhesive anchor, adhesive is sunk into the hole wall of an anchor hole bored in concrete (fixed body), and an anchor bolt is secured to the concrete with the shearing resistance of the cured adhesive. Particularly, in the adhesive anchor of the present embodiment, a tensile force is intensively applied to the tip end side of an anchor bolt to cause concrete to exert proper bearing strength. Note that the term □anchor bolt□ will be hereinafter used as the generic name of a member (that is not limited to a bolt) embedded in concrete to support a structure in an adhesive anchor.

First Embodiment

Figure 1:
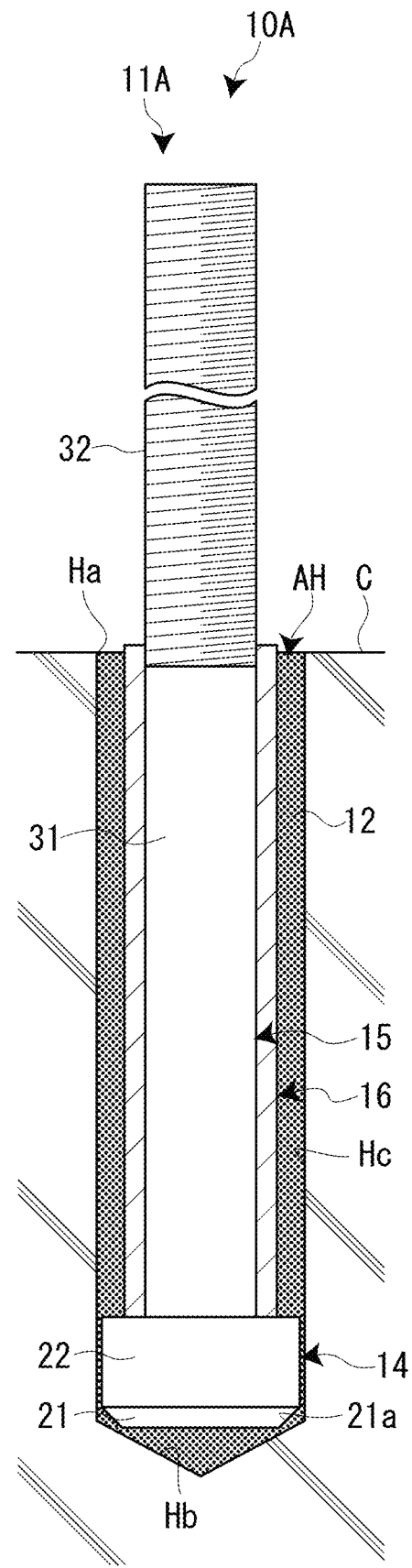
FIG. 1 is a structural view of an adhesive anchor according to a first embodiment.

FIG. 1 is a structural view of an adhesive anchor according to a first embodiment. As shown in the figure, an adhesive anchor 10A includes an anchor bolt 11A (anchor bolt for an adhesive anchor) that is inserted into an anchor hole AH formed in concrete C (fixed body) and adhesive 12 that is filled in the gap between the anchor hole AH and the anchor bolt 11A. The anchor bolt 11A is formed of steel, stainless steel, or the like and integrally formed by a head part 14 that is inserted into the hole back part of the anchor hole AH and a shank part 15 that is continuous with the head part 14. Further, the shank part 15 is provided with a sleeve part 16 that is inserted so as to make its tip end part abutted onto the head part 14.

The head part 14 is formed into a substantially columnar shape and has a guide surface 21a that guides insertion into the anchor hole AH on its tip end side. The head part 14 has a flat surface that is orthogonal to an axial line on its base end side, and the sleeve part 16 is abutted onto this portion. That is, in an axial direction, the head part 14 is integrally formed by a column-shaped part 22 that constitutes a main body and a guide surface part 21 on the tip end side that has the guide surface 21a.

The anchor hole AH is formed into a straight shape from an opening part Ha to a hole bottom Hb, and the diameter (outer diameter) of the head part 14 is formed to be smaller by 0.5 to 1.0 mm than that of the anchor hole AH (straight hole part). Since the anchor hole AH is bored by a vibration drill or a hammer drill in this case, the diameter of the anchor hole AH corresponds to the bit diameter of such a drill. It cannot be expected that the bored anchor hole AH has high-accurate circularity or linearity due to the characteristics of a used drill. Accordingly, a measure of the □0.5 to 1.0 mm□ is a value at which the insertion of the anchor bolt 11A is made possible when the anchor bolt 11A is lightly implanted into the anchor hole AH or a value at which the insertion of the anchor bolt 11A is made possible when the anchor bolt 11A is strongly pressed into the anchor hole AH.

The shank part 15 is formed to have a diameter substantially smaller than that of the head part 14. The shank part 15 is integrally formed into a rod shape by an embedded part 31 that is continuous with the head part 14 and embedded in the anchor hole AH and a support screw part 32 that is continuous with the embedded part 31 and protrudes to the outside of the anchor hole AH. The support screw part 32 is a portion that supports an object and has a male screw on its outer peripheral surface. An object (structure) that is supported by the support screw part 32 is bolted by the support screw part 32 (not shown). Note that the diameter (nominal diameter) of the anchor bolt 11A is the diameter of the shank part 15.

The embedded part 31 is formed into a round-bar shape having no irregularities on its outer peripheral surface. The head part 14 and the shank part 15 are integrally formed with each other in the present embodiment but are preferably formed into a shape obtained by cutting a round bar, a shape obtained by subjecting a round bar to rolling, a shape obtained by welding the head part 14 to the shank part 15, or the like.

However, the head part 14 and the shank part 15 may be separated from each other. In such a case, it is preferable to employ a mode in which a male screw is formed at the tip end of the shank part 15 and a female screw is formed at the head part 14 and in which the head part 14 is screw-connected to the shank part 15. Further, in a case in which the adhesive 12 is of a capsule type (that will be described later), it is preferable to perform processing such as obliquely cutting the tip end of the head part 14 at 45°.

The adhesive 12 is constituted by epoxy adhesive having strong adhesion to the anchor bolt 11A and the concrete C. In this case, a two-part type is used as the adhesive 12 (epoxy adhesive). Further, as the adhesive 12 of a two-part type, there are a capsule type in which two liquids are encapsulated and then crushed inside the anchor hole AH to be stirred and mixed together and an injection type in which two liquids are stirred and mixed together in advance and then injected into the anchor hole AH (the details of which will be described later).

Note that besides epoxy adhesive, the adhesive 12 may be organic adhesive such as polyester adhesive and epoxy acrylate adhesive or may be cement inorganic adhesive. Particularly, since recent inorganic adhesive has higher strength than the concrete C and is highly resistant to degradation, the inorganic adhesive is useful as the adhesive 12 of the adhesive anchor 10A.

The sleeve part 16 extends so as to be adapted to the embedded part 31 of the shank part 15. That is, the sleeve part 16 extends from the opening part Ha to the hole back part of the anchor hole AH. Like the shank part 15 or the like, the sleeve part 16 is formed of steel, stainless steel, or the like. In this case, the sleeve part 16 is formed so as to expose from the opening part Ha of the anchor hole AH by about several millimeters in consideration of the depth accuracy of the anchor hole AH.

The inner peripheral surface of the sleeve part 16 is formed to have almost the same diameter as that of the shank part 15 so that the shank part 15 is inserted into the sleeve part 16. Further, the inner peripheral surface of the sleeve part 16 and the outer peripheral surface of the shank part 15 (the embedded part 31) are formed by smooth surfaces having no irregularities. The inner peripheral surface of the sleeve part 16 and the outer peripheral surface of the shank part 15 (the embedded part 31) are not adhered or secured to each other, and the shank part 15 is allowed to extend by a tensile force. On the other hand, the sleeve part 16 is preferably anchored to the head part 14 by welding, adhesion, or screw connection.

Figure 2:
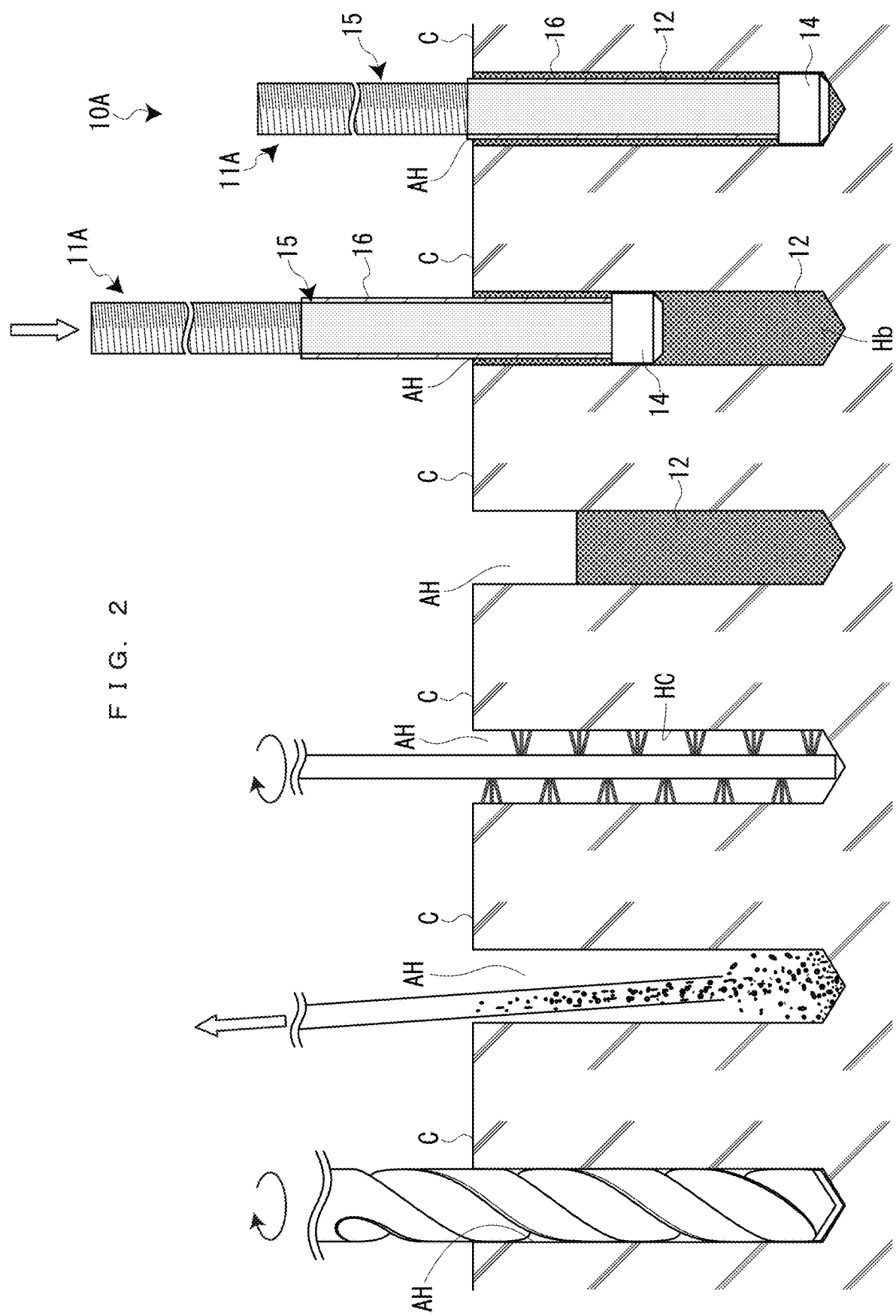
FIG. 2 is an explanatory view of a method for constructing the adhesive anchor (for an injection type) according to the first embodiment.
Figure 3:
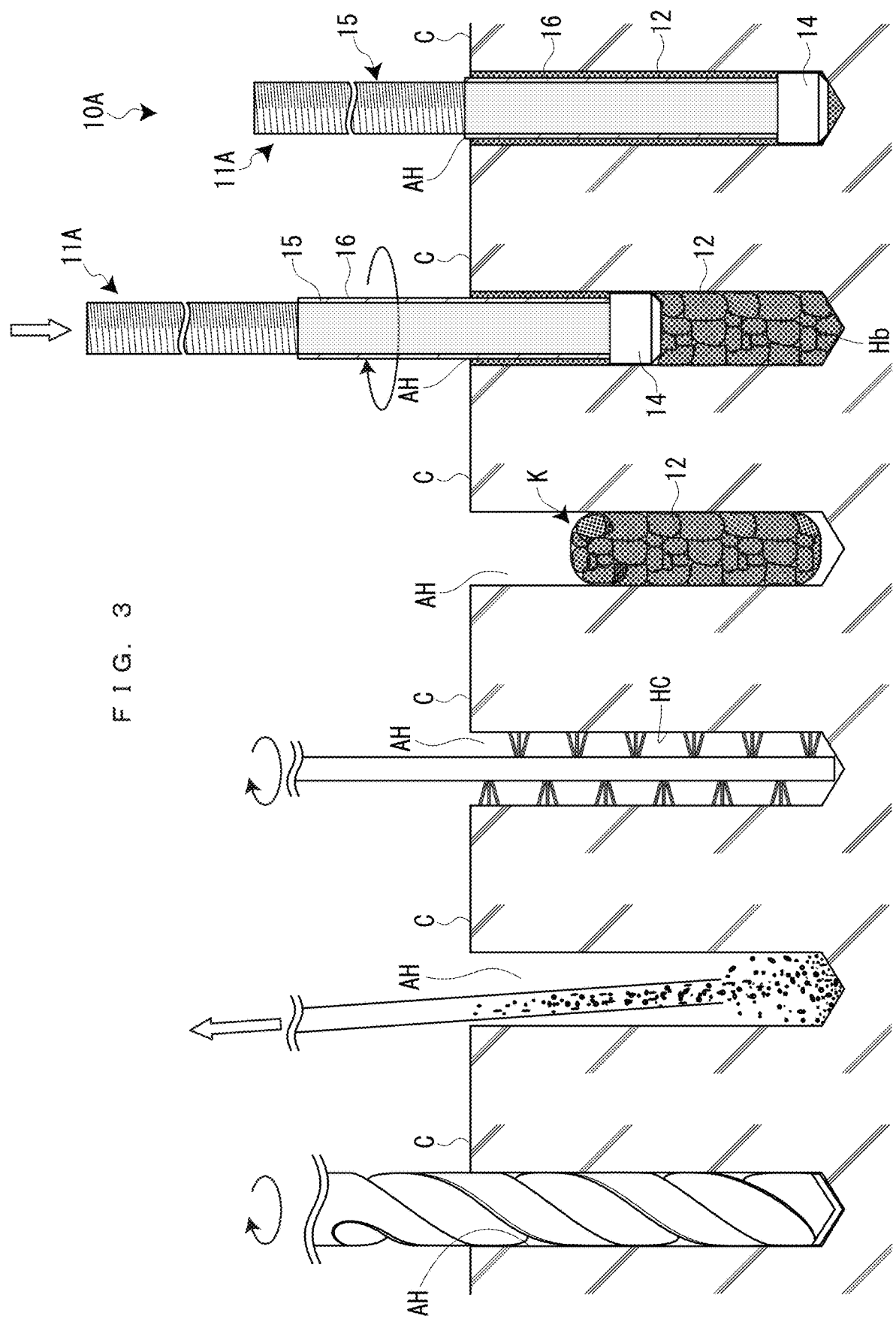
FIG. 3 is an explanatory view of a method for constructing the adhesive anchor (for a capsule type) according to the first embodiment.

Here, methods for constructing the adhesive anchor 10A will be described with reference to FIGS. 2 and 3. As described above, the adhesive 12 of the adhesive anchor 10A includes a capsule type and an injection type. FIG. 2 is an explanatory view of a case in which the adhesive of an injection type is used, and FIG. 3 is an explanatory view of a case in which the adhesive 12 of a capsule type is used. Each of these construction methods includes: a boring and cleaning step of boring the anchor hole AH in the concrete C and cleaning the inside of the anchor hole AH; an injection step of injecting the adhesive 12 into the anchor hole AH; an insertion step of inserting the anchor bolt 11A into the anchor hole AH; and a setting step of maintaining the position of the anchor bolt 11A inside the anchor hole AH until the adhesive 12 is cured.

The details of the boring and cleaning step are the same regardless of whether the capsule type or the injection type is used. In the boring of the anchor hole AH, a hole having a prescribed diameter and a prescribed depth is bored in the concrete C by a vibration drill or a hammer drill. In this case, the anchor hole AH is set to have a boring diameter greater by about 3 to 5 mm than that of the sleeve part 16 of the anchor bolt 11A having a small diameter, and is set to have a boring diameter greater by about 10 mm than that of the sleeve part 16 of the anchor bolt 11A having a large diameter. In the cleaning of the inside of the anchor hole AH, concrete powder (swarf) is sucked and removed by, for example, air suction or the like, and then the hole wall Hc is brushed to carefully remove the concrete powder inside the hole. The cleaning step is actually performed in the order of suction, brushing, and suction.

In the injection step of injecting the adhesive 12 of an injection type shown in FIG. 2, two liquids constituting the adhesive 12 that had been stirred and mixed together in advance are injected into the anchor hole AH by an injector or the like. In this case, the amount of the injected adhesive 12 is preferably set at almost (an amount slightly larger than) an amount obtained by subtracting the volume of a portion in which the anchor bolt 11A is embedded from the capacity of the anchor hole AH.

After the injection of the adhesive 12 into the anchor hole AH, the anchor bolt 11A is inserted into the anchor hole AH so as to make the head part 14 reach the hole bottom Hb (insertion step). Specifically, the anchor bolt 11A is inserted into the anchor hole AH with the tip end of the sleeve part 16 abutted onto and anchored to the head part 14. Then, after the insertion of the anchor bolt 11A into the anchor hole AH, an excess of the adhesive 12 is wiped off, and the anchor bolt 11A is set so as not to move until the adhesive 12 is cured (setting step).

On the other hand, in the injection step of injecting the adhesive 12 of a capsule type shown in FIG. 3, a capsule K (actually expressed by the gram) adapted to the diameter and the boring depth of the anchor hole AH is prepared and put in the anchor hole AH. Before or after the putting of the capsule K, a coupler is attached to the support screw part 32 of the anchor bolt 11A, and the anchor bolt 11A is set in a drill (for example, a vibration drill) via the coupler.

Here, the anchor bolt 11A is inserted into the anchor hole AH in a state of being set in the drill, and rotated to crush the capsule K and stir and mix the two liquids together. Then, using the base end of the sleeve part 16 as a measure of an embedding depth, the anchor bolt 11A is embedded while the adhesive 12 is stirred and mixed together (insertion step). After the embedding of the anchor bolt 11A in the manner described above, the drill is removed. Then, the anchor bolt 11A is set so as not to move until the adhesive 12 is cured (setting step).

[Modified Example of First Embodiment]

Figure 4:
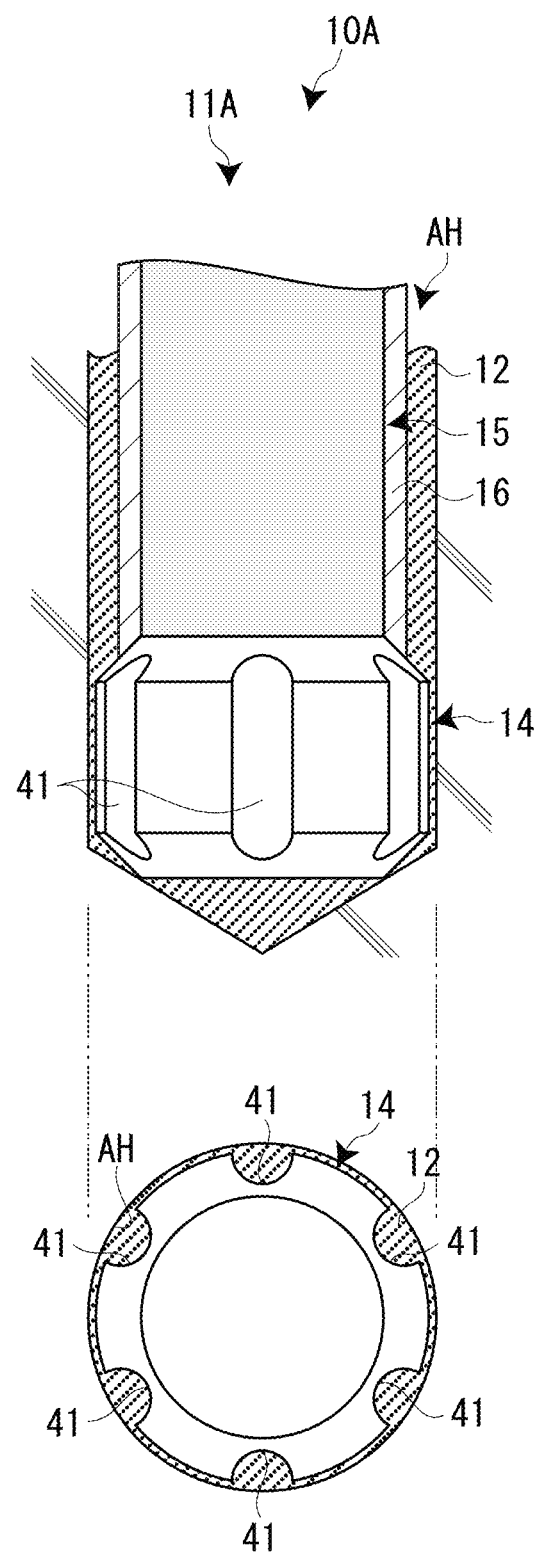
FIG. 4 is a structural view of the surrounding of a head part according to a modified example of the first embodiment.

Next, a modified example of the anchor bolt 11A of which the mode of the head part 14 is different from that of the first embodiment will be described with reference to FIG. 4. The head part 14 of the modified example has, on its outer peripheral surface, a plurality of circulation grooves 41 (circulation parts) that cause the adhesive 12 to circulate during its insertion into the anchor hole AH.

As described above, the diameter of the head part 14 is formed to be smaller by 0.5 to 1.0 mm than that of the anchor hole AH. As a result, the viscous resistance of the adhesive 12 strongly acts on the head part 14 when the anchor bolt 11A is inserted into the anchor hole AH. In order to address this, the outer peripheral surface of the head part 14 is provided with the plurality of (six in the embodiment) circulation grooves 41 in the modified example. The respective circulation grooves 41 are constituted by so called vertical grooves that extend parallel to each other in an axial direction and have a semicircular shape in cross section. Further, the six circulation grooves 41 are arranged at even intervals in a circumferential direction. Note that the cross-sectional shape of the circulation grooves 41 may be a rectangle, a trapezoid, or the like.

Since the head part 14 has the plurality of circulation grooves 41 as described above, the anchor bolt 11A can be smoothly inserted into the anchor hole AH even if the gap between the anchor hole AH and the head part 14 is small. Further, in a case in which the adhesive 12 of a capsule type is used, the stirring and mixture of the adhesive 12 can be accelerated by the circulation grooves 41.

Note that although the six circulation grooves 41 are provided in the modified example, one or more pieces of the circulation grooves 41 is only required to be provided. Further, the circulation grooves 41 may be inclined grooves that are inclined with respect to the axial direction (to accelerate the stirring and mixture of the adhesive 12). However, it is also possible to replace the circulation grooves 41 with circulation holes. Needless to say, the head part 14 of the present modified example can be applied to the head parts 14 of the following other embodiments.

As described above, a tensile force (pulling force) acts on the sleeve part 16 as a compressive force via the head part 14 when the tensile force acts on the shank part 15 according to the adhesive anchor 10A of the first embodiment. Since the sleeve part 16 is secured by the adhesive 12 filled between the sleeve part 16 and the anchor hole AH in this case, the anchor bolt 11A exerts a wedge effect on the concrete C at the head part 14.

Further, since a tensile force (compressive force for the sleeve part 16) acts on the sleeve part 16 from the tip end side via the head part 14, the tensile force does not intensively act on the base end side (on the side of the opening part Ha) of the sleeve part 16 and failure (mushroom-shaped superposed failure) is not caused at a shallow portion of the concrete C. Accordingly, substantial tensile strength can be exerted at a shallower embedding depth over conventional art. Further, since the shank part 15 is not liable to be influenced by the adhesive 12, its extension (toughness) can be fully used to support an object (structure).

Second Embodiment

Figure 5:
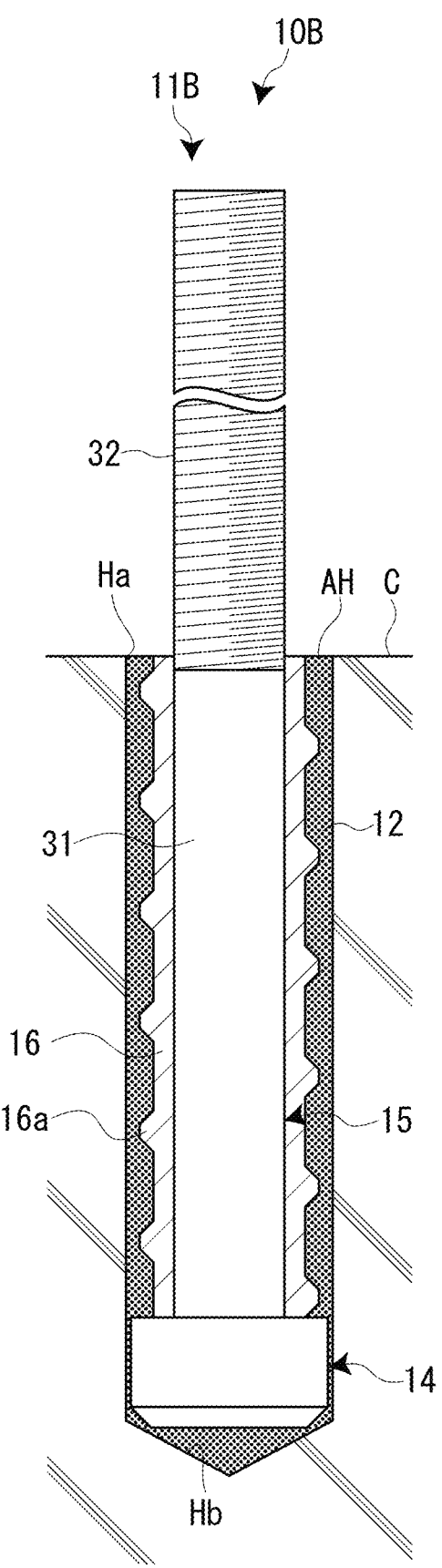
FIG. 5 is a structural view of an adhesive anchor according to a second embodiment.

Next, an adhesive anchor 10B according to a second embodiment will be described with reference to FIG. 5. Note that the portion of the second embodiment different from that of the first embodiment will be mainly described. In this embodiment, an outer peripheral surface 16a of a sleeve part 16 of an anchor bolt 11B that contacts adhesive 12 is formed into an irregularity shape.

Specifically, the outer peripheral surface 16a of the sleeve part 16 is formed into an irregularity shape like the outer peripheral surface of a deformed bar. The irregularity shape in this case is only required to be one that contributes to the tensile strength of the anchor bolt 11B and maybe an irregularity like, for example, a full thread. Further, the sleeve part 16 is preferably anchored to a head part 14 by welding or the like in this case as well.

According to the adhesive anchor 10B of the second embodiment described above, substantial tensile strength can be exerted at a shallower embedding depth over conventional art and the extension (toughness) of a shank part 15 can be fully used to support an object (structure) like the first embodiment. Further, the shearing resistance of the adhesive 12 can be substantially exerted by the irregularity shape of the outer peripheral surface 16a of the sleeve part 16, and the tensile strength can be further improved.

Third Embodiment

Figure 6:
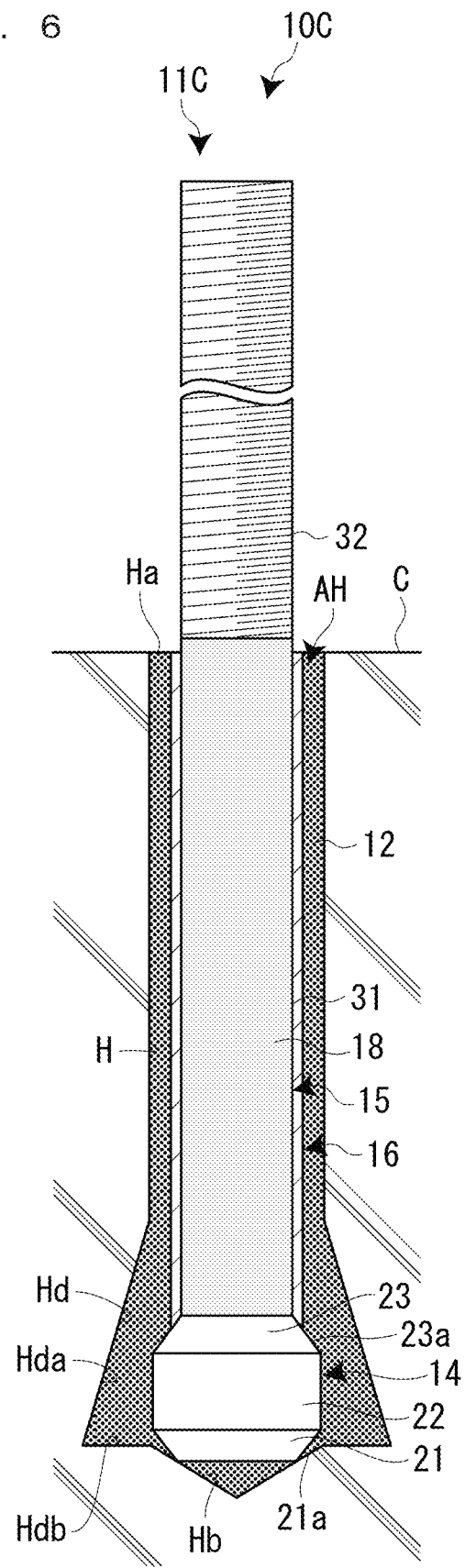
FIG. 6 is a structural view of an adhesive anchor according to a third embodiment.

Next, an adhesive anchor 10C according to a third embodiment will be described with reference to FIG. 6. Note that the portions of the third embodiment different from those of the first embodiment will be mainly described. In this embodiment, an anchor hole AH has a diameter expanded part Hd (bottom expanded part), and a head part 14 of an anchor bolt 11C has a mode adapted to the diameter expanded part Hd.

The anchor hole AH has a lower hole part H having a straight shape and the diameter expanded part Hd that is formed at the back of the lower hole part H. The diameter expanded part Hd has a tapered hole part Hda that is formed into a tapered shape and positioned on the side of an opening part Ha and a bottom expanded hole part Hdb that is formed into a straight shape. On the other hand, the anchor bolt 11C has the head part 14, a shank part 15, and a sleeve part 16 like the first embodiment.

The head part 14 in this case has, in an axial direction, a tapered surface part 23 on a base end side that has a tapered surface 23a, an intermediate column-shaped part 22, and a guide surface part 21 on a tip end side that has a guide surface 21a. Further, the tapered surface part 23 faces the tapered hole part Hda of the anchor hole AH across adhesive 12 and has the same tapered angle as that of the tapered hole part Hda. Note that the tapered surface part 23 is not necessarily required to have the same tapered angle as that of the tapered hole part Hda.

Note that a method for constructing the adhesive anchor 10C according to the third embodiment is the same as that of the first embodiment. However, in a boring and cleaning step, the diameter expanded part Hd is formed at the hole back part of the anchor hole AH after the boring of the anchor hole AH (not shown). That is, the above bored anchor hole AH (straight hole) is a so-called prepared hole, and a diameter expansion drill bit attached to an electric drill is inserted into the prepared hole, and the hole wall Hc of the hole back part is ground to form the diameter expanded part Hd.

As described above, the anchor hole AH has the diameter expanded part Hd according to the adhesive anchor 10C of the third embodiment. Therefore, a tensile force (pulling force) that is applied to the head part 14 inside the diameter expanded part Hd can be caused to act not only on the adhesive 12 but also on concrete C via the tapered hole part Hda by the tapered surface part 23 in a dispersed manner. As a result, tensile strength can be improved as a whole.

Since most of the tensile force that is applied to the head part 14 is received at the tapered hole part Hda via the adhesive 12 particularly in this case, tensile strength can be substantially obtained. Further, since the adhesive 12 with its bottom expanded and the anchor bolt 11C are integrated with each other, the tensile strength of the anchor bolt 11C can be maintained even if cracks are, for example, caused in the concrete C across the anchor bolt 11C.

10A, 10B, 10C Adhesive anchor
11A, 11B, 11C Anchor bolt
12 Adhesive
14 Head part
15 Shank part
16 Sleeve part
16a Outer peripheral surface
21 Guide surface part
23 Tapered surface part
31 Embedded part
41 Circulation groove
AH Anchor hole
C Concrete
Ha Opening part
Hb Hole bottom
Hc Hole wall
Hd Diameter expanded part
Hda Tapered hole part

What is claimed is:

1. An anchor bolt for an adhesive anchor that is fixed via adhesive to an anchor hole formed in a fixed body, the anchor bolt comprising:
    a head part that is configured to be inserted into a hole back part of the anchor hole;
    a shank part that is continuous with the head part and formed to have a diameter smaller than a diameter of the head part; and
    a sleeve part into which the shank part is inserted, the sleeve part is configured to extend from an opening part to the hole back part of the anchor hole and having a tip end thereof abutted onto the head part, wherein
        the head part and the shank part are integrally formed with each other as a one-piece unitary member,
        the sleeve part is formed of steel or stainless steel,
        an outer peripheral surface of the sleeve part is configured to be secured by the adhesive to contribute to tensile strength, and
        the shank part includes:
            an embedded part that is configured to be embedded in the anchor hole; and
            a support screw part that is continuous with the embedded part, is configured to protrude to an outside of the anchor hole, and has a male screw on an outer peripheral surface.

2. The anchor bolt for an adhesive anchor according to claim 1, wherein
    the tip end of the sleeve part is anchored to the head part.

3. The anchor bolt for an adhesive anchor according to claim 1, wherein
    the outer peripheral surface of the sleeve part is formed into an irregularity shape.

4. The anchor bolt for an adhesive anchor according to claim 1, wherein
    the anchor hole has a straight hole part that extends from the opening part to the hole back part, and
    the head part has a circulation part that causes the adhesive to relatively circulate from a tip end side to a base end side thereof during the insertion.

5. The anchor bolt for an adhesive anchor according to claim 1, wherein
    the anchor hole has a diameter expanded part at the hole back part into which the head part is configured to be inserted,
    the diameter expanded part has a tapered hole part that expands toward a hole bottom side, and
    the head part has a tapered surface part that is configured to face the tapered hole part.

6. An adhesive anchor comprising:
    the anchor bolt for an adhesive anchor according to claim 1; and
    the adhesive filled in a gap between the anchor hole and the anchor bolt.

7. A method for constructing the adhesive anchor according to claim 6, the method comprising:
    a boring and cleaning step of boring the anchor hole in the fixed body and cleaning an inside of the anchor hole;
    an injection step of injecting the adhesive into the anchor hole;
    an insertion step of inserting the anchor bolt into the anchor hole; and
    a setting step of maintaining a position of the anchor bolt inside the anchor hole until the adhesive is cured.

* * * * *